Sept. 7, 1937.  R. P. ANDERSON  2,092,198
REMOVABLE PAN HANDLE
Filed June 8, 1936
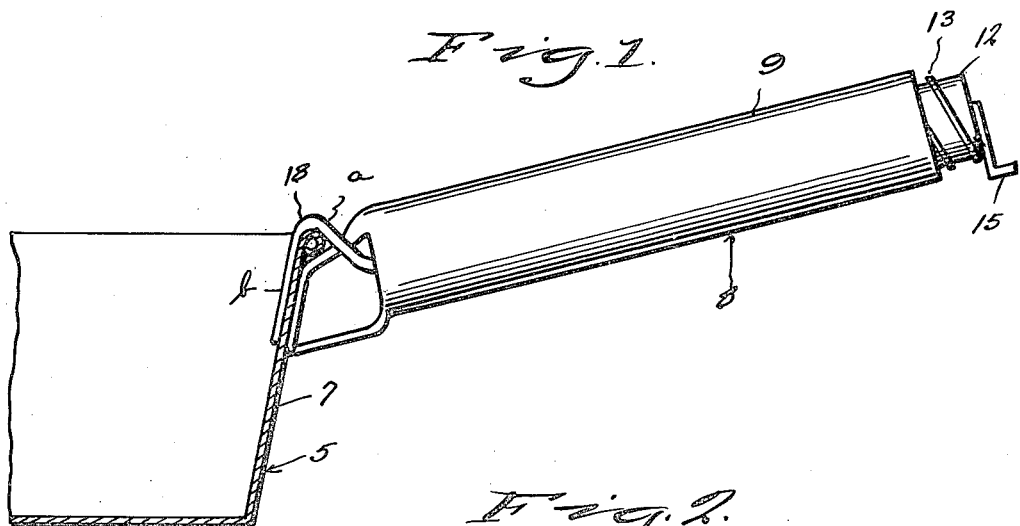
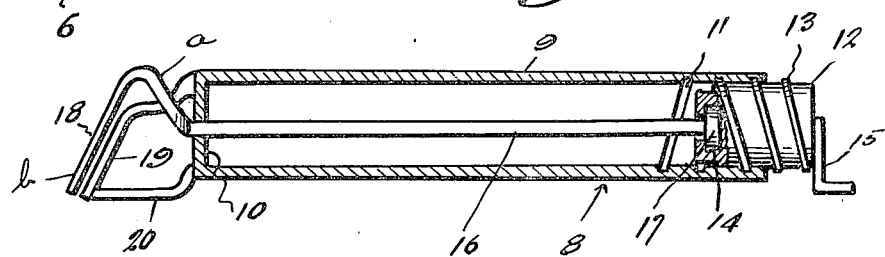
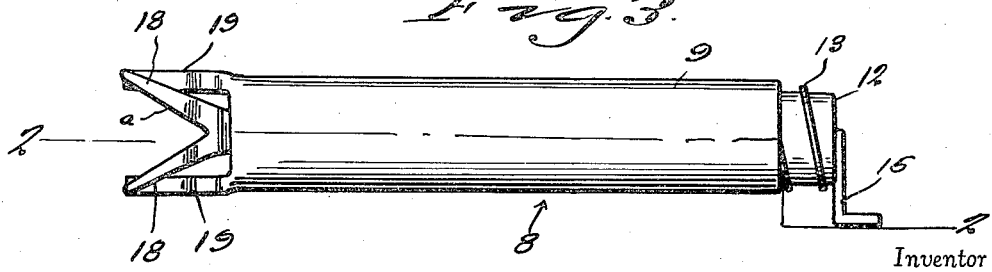
Inventor
Robert P. Anderson
By Clarence A. O'Brien and
Hyman Berman
Attorney Patented Sept. 7, 1937

2,092,198

UNITED STATES PATENT OFFICE 2,092,198

REMOVABLE PAN HANDLE

Robert P. Anderson, Norwich, N. Y.

Application June 8, 1936, Serial No. 84,218

3 Claims. (Cl. 16—114)

This invention appertains to new and useful improvements in handles for pots, pans and the like.

The principal object of the present invention is to provide a handle which can be readily attached firmly to a pan and when the handle is no longer needed can be easily detached and stored away in a small space.

Other important objects and advantages of the invention will become apparent to the reader of the following specification.

In the drawing:—

Figure 1 represents a side elevational view of the handle attached to a pan.

Figure 2 is a longitudinal sectional view through the handle.

Figure 3 is a top plan view of the handle.

Referring to the drawing wherein like numerals designate like parts, it can be seen in Figure 1, that the numeral 5 generally refers to a pan consisting of a bottom wall 6 and the side wall 7.

The numeral 8 generally refers to the novel handle construction which consists of the elongated hand grip barrel 9 closed at one end as at 10 and provided with a spiral internal grooveway 11 at its opposite end. The numeral 12 represents a cylindrical body provided with threads 13 for riding engagement in the spiral grooveway 11. This cylindrical body 12 is provided with a pocket 14 at its inner end and a crank-shaped handle 15 at its outer end. Numeral 16 is an elongated rod or shaft having a head rotatably disposed in the pocket 14. This affords a swiveled connection between the cylindrical body 12 and the rod 16. The forward end of the rod 16 extends through a small opening in the end wall 10 and is provided with tines 18. These tines extend upwardly as at $a$ and decline as at $b$. The portions $b$ of these tines are in parallel relation to the inclined leg portions 19 protruding from the end wall 10 and which are braced as at 20. Obviously, by engaging the wall 7 of a pan between the leg members 19 and the tines 18 and then turning the crank 15 for feeding the body 12 outwardly, the tines 18 will with the cooperation of the leg members 19 firmly clamp the handle 8 to the pan.

While the foregoing specification sets forth the invention in specific terms, it is to be understood that numerous changes in the shape, size and materials may be resorted to without departing from the spirit and scope of the invention as claimed hereinafter.

What is claimed is:—

1. A handle structure of the character described comprising a barrel provided with a member threadably feedable in one end thereof, a rod swivelly connected to and extending from the said member and provided with an extension for engaging one side of an object for clamping the object between itself and the adjacent end of the barrel when the feedable member is moved in one direction.

2. A handle structure of the character described comprising a barrel provided with a member feedable in one end thereof, a rod extending from the said member provided with an extension for engaging one side of an object for clamping the object between itself and the adjacent end of the barrel when the feedable member is moved in one direction, said feedable member consisting of a body threaded into one end of the barrel, said rod and body being provided with swiveled connecting means.

3. A handle structure of the character described comprising a barrel provided with a member threadably feedable in one end thereof, a rod swivelly connected to and extending from the said member and provided with an extension for engaging one side of an object for clamping the object between itself and the adjacent end of the barrel when the feedable member is moved in one direction, one end of the barrel being provided with leg members, the extended end of the rod being provided with tines.

ROBERT P. ANDERSON.